US012766831B2

United States Patent

Hanada

(12) United States Patent
(10) Patent No.: US 12,766,831 B2
(45) Date of Patent: Oct. 20, 2026

(54) DRIVE CONTROLLER, HEAD DEVICE, AND LIQUID DISCHARGE APPARATUS

(71) Applicant: Takaya Hanada, Kanagawa (JP)

(72) Inventor: Takaya Hanada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 97 days.

(21) Appl. No.: 18/727,599

(22) PCT Filed: Jan. 18, 2023

(86) PCT No.: PCT/IB2023/050415
§ 371 (c)(1),
(2) Date: Jul. 9, 2024

(87) PCT Pub. No.: WO2023/166358
PCT Pub. Date: Sep. 7, 2023

(65) Prior Publication Data

US 2025/0091342 A1 Mar. 20, 2025

(30) Foreign Application Priority Data

Mar. 3, 2022 (JP) ................................ 2022-032747

(51) Int. Cl.
*B41J 2/045* (2006.01)

(52) U.S. Cl.
CPC ....... *B41J 2/04588* (2013.01); *B41J 2/04541* (2013.01); *B41J 2/04581* (2013.01);
(Continued)

(58) Field of Classification Search
CPC .................................................... B41J 2202/05
See application file for complete search history.

(56) References Cited

U.S. PATENT DOCUMENTS 6,053,596 A * 4/2000 Nakano .................. B41J 2/2132 347/15
2005/0103902 A1* 5/2005 Hornsell ............. F16K 31/0655 239/585.1
(Continued)

FOREIGN PATENT DOCUMENTS

CN 107427858 A 12/2017
CN 108248037 A 7/2018
(Continued)

OTHER PUBLICATIONS

International Search Report and Written Opinion issued on Mar. 23, 2023 in PCT/IB2023/050415 filed on Jan. 18, 2023.
(Continued)

*Primary Examiner* — Shelby L Fidler
(74) *Attorney, Agent, or Firm* — Harness, Dickey & Pierce, P.L.C.

(57) ABSTRACT

A drive controller includes: circuitry configured to: drive a liquid discharge head, including a discharge port and a valve to open and close the discharge port, to discharge a liquid from the discharge port, generate a drive pulse to drive the valve to open and close the discharge port; and the drive pulse including: a first drive pulse to hold the valve at a first displacement amount for a first holding time; and a second drive pulse to hold the valve at a second displacement amount for a second holding time, wherein the second holding time is shorter than the first holding time, and a second average value of the second displace amount is larger than a first average value of the first displace amount.

20 Claims, 10 Drawing Sheets

(52) U.S. Cl.
CPC ........ *B41J 2/04593* (2013.01); *B41J 2202/05* (2013.01); *B41J 2202/06* (2013.01)

(56) References Cited

U.S. PATENT DOCUMENTS

| | | | | |
|---|---|---|---|---|
| 2005/0190220 | A1 | 9/2005 | Lim et al. | |
| 2009/0167818 | A1* | 7/2009 | Morita | B41J 2/14201 239/91 |
| 2016/0339467 | A1* | 11/2016 | Conner | H10N 30/802 |
| 2017/0252770 | A1* | 9/2017 | Sugai | B41J 2/04581 |
| 2018/0071766 | A1* | 3/2018 | Ikushima | B05C 11/1026 |
| 2018/0178533 | A1 | 6/2018 | Sakai et al. | |
| 2019/0344564 | A1* | 11/2019 | Buskirk | B41J 2/04586 |
| 2020/0039217 | A1 | 2/2020 | Kaiba et al. | |
| 2022/0111405 | A1 | 4/2022 | Maruyama et al. | |
| 2022/0184967 | A1 | 6/2022 | Hiraga | |

FOREIGN PATENT DOCUMENTS

| | | | |
|---|---|---|---|
| EP | 1099483 | A1 | 5/2001 |
| EP | 1568497 | A2 | 8/2005 |
| EP | 3300890 | A2 | 4/2018 |
| JP | H05-285434 | A | 11/1993 |
| JP | 2004142382 | A | 5/2004 |
| JP | 2004-358412 | A | 12/2004 |
| JP | 2008-188496 | A | 8/2008 |
| JP | 2018051477 | A | 4/2018 |
| JP | 2020023177 | A | 2/2020 |
| JP | 2021084427 | A | 6/2021 |

OTHER PUBLICATIONS

Japanese Office Action dated Nov. 20, 2025 for corresponding Japanese Application No. 2022-032747 and English-language translation thereof.

Chinese Office Action dated May 21, 2026 for corresponding Chinese Application No. 202380024911.5.

* cited by examiner

DRIVE CONTROLLER, HEAD DEVICE, AND LIQUID DISCHARGE APPARATUS

CROSS-REFERENCE TO RELATED APPLICATIONS

This application is a national phase under 35 U.S.C. § 371 of PCT International Application No. PCT/IB2023/050415 which has an International filing date of Jan. 18, 2023, which claims priority to Japanese Application No. 2022-032747, filed Mar. 3, 2022, the entire contents of each of which are hereby incorporated by reference.

TECHNICAL FIELD

The present embodiment relates to a drive controller, a head device, and a liquid discharge apparatus.

BACKGROUND ART

There are liquid discharge heads that open and close a discharge port using an opening and closing valve to discharge a liquid. Furthermore, there is a drive controller that applies a voltage to a drive element, which drives the opening and closing valve, to control driving of the opening and closing valve.

For example, Patent Literature 1 (Japanese Unexamined Patent Application Publication No. 2018-51477) describes a liquid discharge apparatus in which a voltage is applied to a piezoelectric element to expand and contract the piezoelectric element, and thus a movable body is moved to open and close a discharge port so that a liquid is discharged through the discharge port. In this liquid discharge apparatus, after the discharge process in which the movable body is reciprocated once to start discharging the liquid through the discharge port, a movement process is performed to reciprocate the movable body again to generate the force toward a storage chamber in the liquid discharged through the discharge port. This prevents the liquid from remaining outside the discharge port. Moreover, in the description, the movement process makes it possible to select a plurality of movement waveforms for different movement distances of the movable body.

Each time the liquid is discharged from the liquid discharge head, there are differences in the discharge conditions, such as the desired droplet size and discharge cycle, and external conditions such as ambient temperature, and these differences in the conditions affect the discharge velocity and the discharge amount of the liquid, etc. Therefore, there are disadvantages such as variations in the discharge state of the liquid from the liquid discharge head and variations in the quality of printed images.

CITATION LIST

Patent Literature

[PTL 1]

Patent Literature 1: Japanese Unexamined Patent Application Publication No. 2018-51477

SUMMARY OF INVENTION

Technical Problem

The drive controller according to the present embodiment stabilize the discharge state of the liquid from the liquid discharge head.

Solution to Problem

In an aspect of the present disclosure, a drive controller includes: circuitry configured to: drive a liquid discharge head, including a discharge port and a valve to open and close the discharge port, to discharge a liquid from the discharge port, generate a drive pulse to drive the valve to open and close the discharge port; and the drive pulse including: a first drive pulse to hold the valve at a first displacement amount for a first holding time; and a second drive pulse to hold the valve at a second displacement amount for a second holding time, wherein the second holding time is shorter than the first holding time, and a second average value of the second displace amount is larger than a first average value of the first displace amount.

Advantageous Effects of Invention

According to the present embodiment, the discharge state of the liquid from the liquid discharge head may be stabilized.

BRIEF DESCRIPTION OF DRAWINGS

A more complete appreciation of embodiments of the present disclosure and many of the attendant advantages and features thereof can be readily obtained and understood from the following detailed description with reference to the accompanying drawings.

FIG. 9A is a graph illustrating an example of the waveform of the drive pulse, and FIG. 9B illustrates an example of the shape of droplets discharged by the drive pulse.

FIG. 10A is a graph illustrating the waveform of the drive pulse, and FIG. 10B illustrates an example of the shape of a droplet discharged by the drive pulse.

Figure 1:
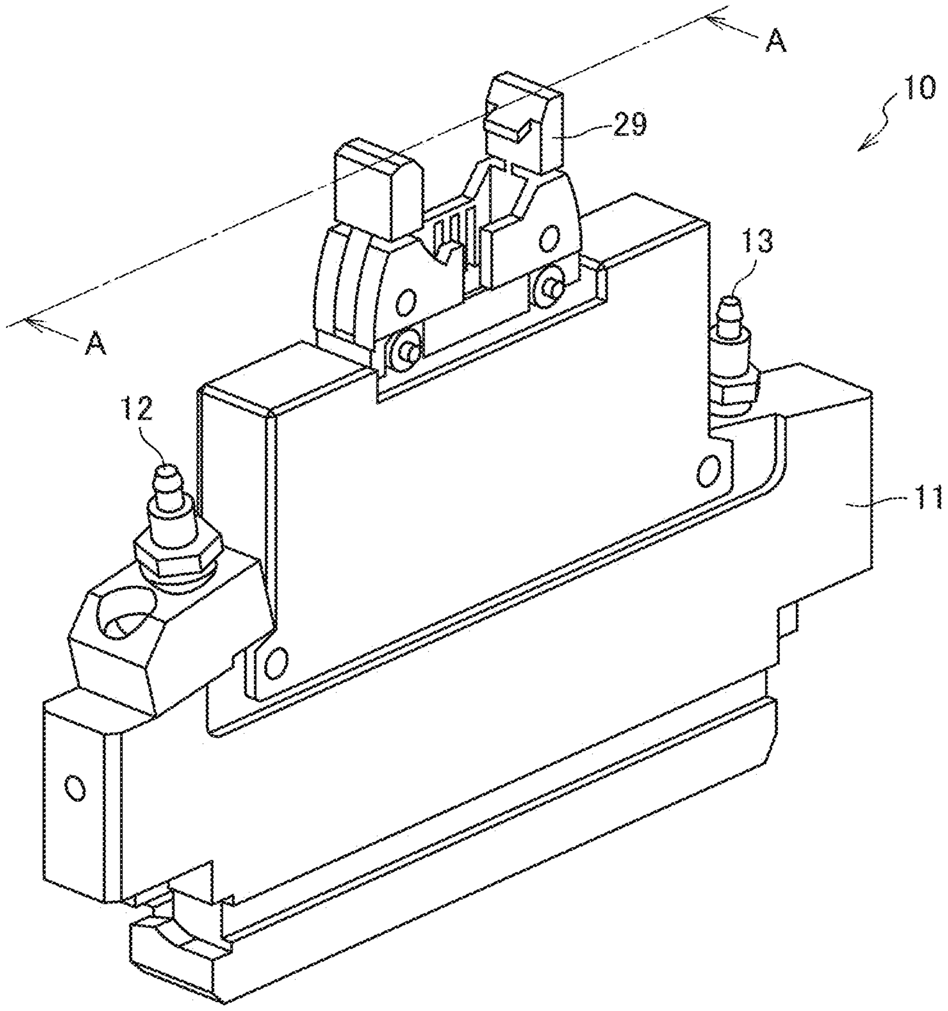
FIG. 1 is a perspective view of an example of a liquid discharge head.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An embodiment of the present disclosure will be described below referring to the drawings. In the following description, a drive controller that controls driving of an opening and closing valve provided in a liquid discharge head is described as the drive controller according to the embodiment of the present disclosure. The liquid discharge head discharges ink as a liquid.

FIG. 1 is a perspective view of an overall liquid discharge head.

A liquid discharge head 10 includes a housing 11. The housing 11 includes metal or resin. The housing 11 includes, in an upper portion thereof, a connector 29 to communicate electrical signals. The housing 11 includes, in right and left portions thereof, a supply port 12 and a collection port 13. The supply port 12 is used to supply ink to an interior of the liquid discharge head 10. The collection port 13 is used to discharge ink from the liquid discharge head 10.

Figure 2:
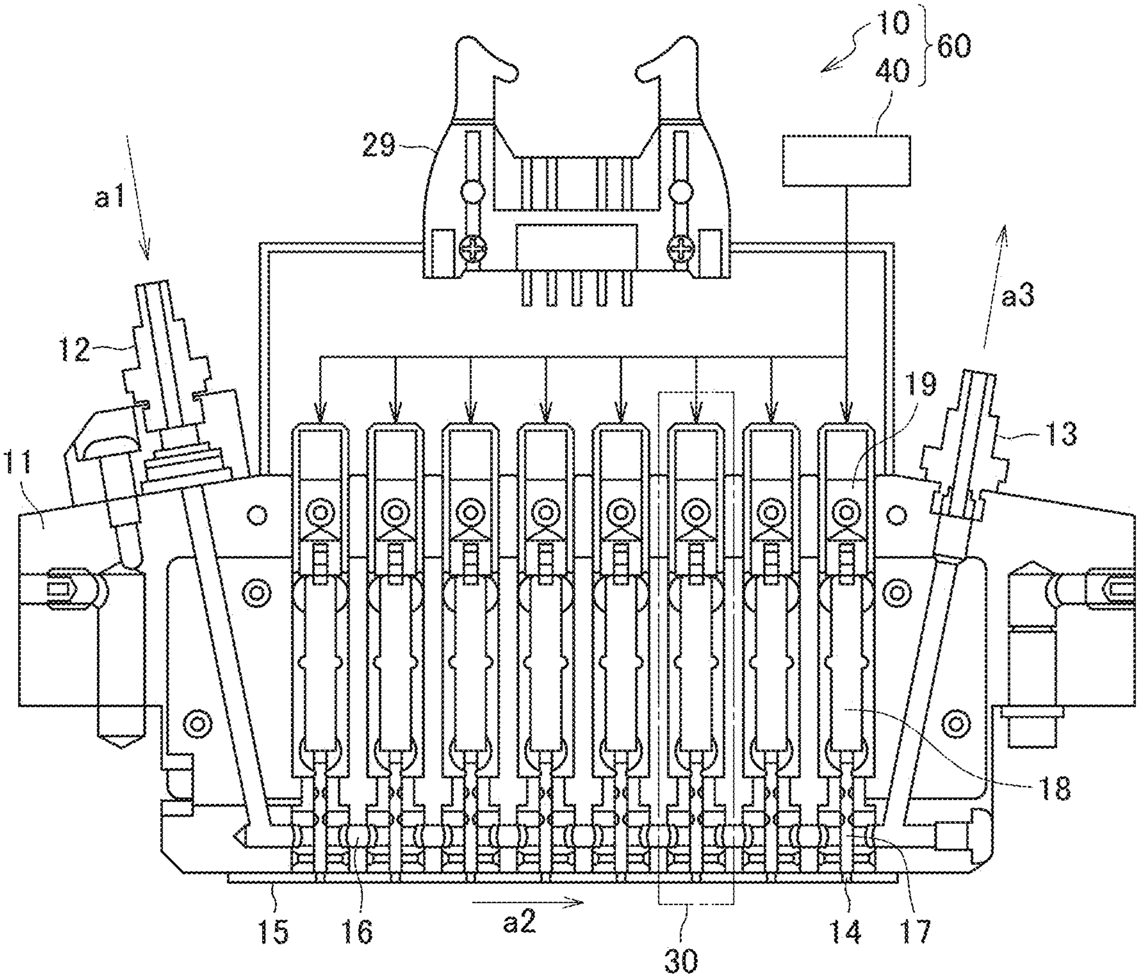
FIG. 2 is a diagram illustrating an example of a head device.

FIG. 2 is a diagram illustrating a head device on the cross-section of the liquid discharge head taken through A-A in FIG. 1.

A head device 60 includes the liquid discharge head 10 and a drive controller 40.

The liquid discharge head 10 includes a nozzle plate 15. The nozzle plate 15 is bonded to the housing 11. The nozzle plate 15 includes a nozzle 14 that discharges the ink. The housing 11 includes a channel 16. The channel 16 is a channel that sends the ink from the supply port 12 side through the nozzle plate 15 to the collection port 13 side. The ink is sent on the channel 16 in the direction indicated by arrows a1 to a3 in FIG. 2.

A liquid discharge module 30 is provided between the supply port 12 and the collection port 13. The liquid discharge module 30 discharges the ink in the channel 16 through the nozzle 14. The number of the liquid discharge modules 30 corresponds to the number of the nozzles 14, and this example illustrates the configuration including the eight liquid discharge modules 30 corresponding to the eight nozzles 14 arranged in a row. The number and the arrangement of the nozzles 14 and the liquid discharge modules 30 are not limited to eight as described above. For example, the number of the nozzles 14 and the liquid discharge modules 30 may be one instead of multiple. The nozzles 14 and the liquid discharge modules 30 may be arranged in multiple rows instead of a single row.

In the above-described configuration, the supply port 12 takes in the ink in a pressurized state from outside, sends the ink in the direction indicated by the arrow a1, and supplies the ink to the channel 16. The channel 16 sends the ink from the supply port 12 in the direction indicated by the arrow a2. Then, the collection port 13 discharges the ink, which has not been discharged through the nozzles 14, in the direction indicated by the arrow a3. The nozzles 14 are arranged along the channel 16.

The liquid discharge module 30 includes a needle valve 17 and a piezoelectric element 18. The needle valve 17 opens and closes the nozzle 14. The piezoelectric element 18 drives the needle valve 17.

The housing 11 includes a regulation member 19 at a position facing an upper end of the piezoelectric element 18. The regulation member 19 is in contact with an upper end of the piezoelectric element 18 and serves as a securing point of the piezoelectric element 18.

Here, the nozzle 14 is an example of a discharge port. The nozzle plate 15 is an example of a discharge port forming member. The needle valve 17 is an example of an opening and closing valve. The piezoelectric element 18 is an example of a drive element.

When the piezoelectric element 18 is operated to move the needle valve 17 upward, the nozzle 14 closed by the needle valve 17 is opened to discharge the ink through the nozzle 14. When the piezoelectric element 18 is operated to move the needle valve 17 downward, a distal end portion of the needle valve 17 comes into contact with the nozzle 14 to close the nozzle 14 so that the ink is not discharged through the nozzle 14. In order to prevent a reduction in the discharge efficiency of the ink through the nozzle 14, the ink discharge through the collection port 13 may be temporarily stopped during the period in which the ink is being discharged to the liquid discharge object.

Figure 3A:
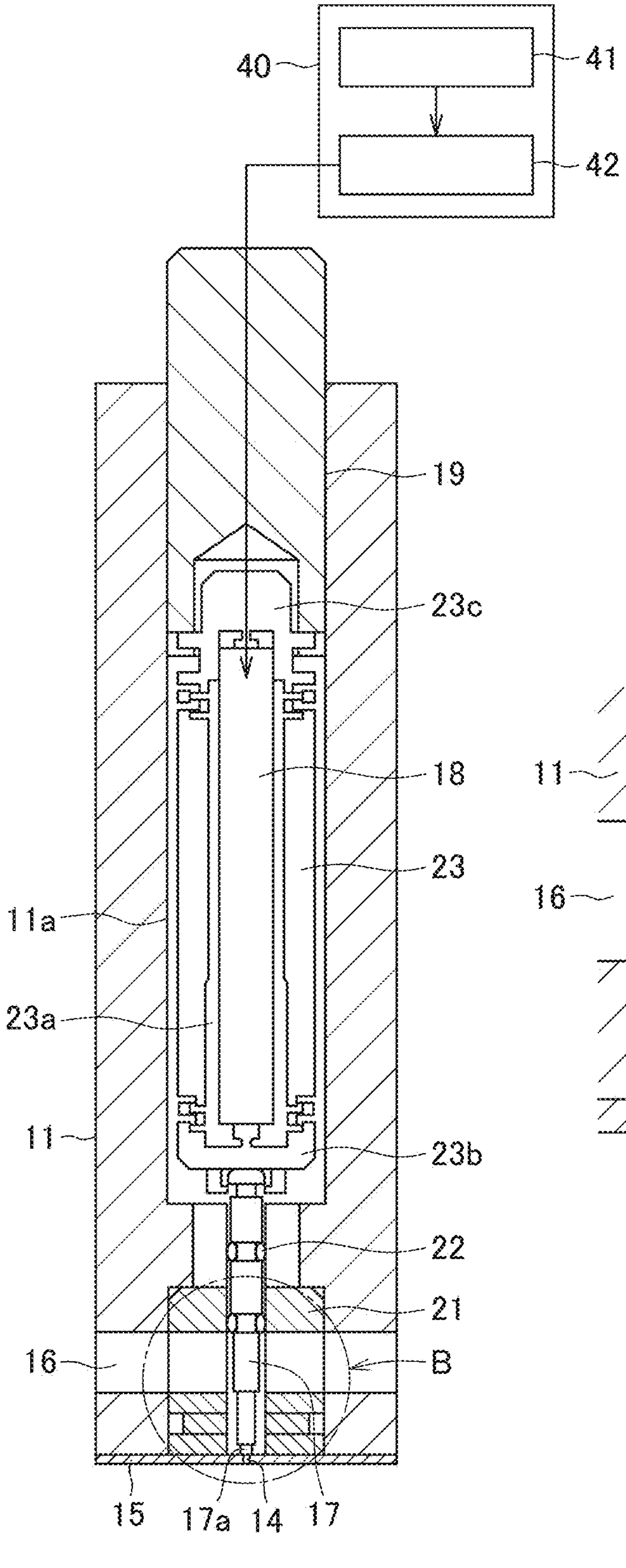
FIGS. 3A and 3B are cross-sectional views of an example of a liquid discharge module.
Figure 3B:
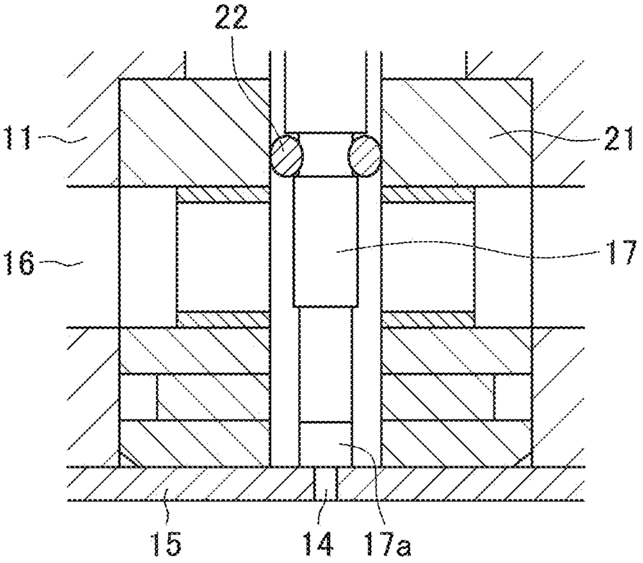

FIGS. 3A and 3B are explanatory diagrams of the liquid discharge module alone that forms the liquid discharge head. FIG. 3A is a cross-sectional view of the overall liquid discharge module, and FIG. 3B is an enlarged view of a portion B in FIG. 3A.

The channel 16 is a common channel for the plurality of liquid discharge modules 30 provided in the housing 11.

The needle valve 17 includes an elastic member 17*a* at its end. When the end of the needle valve 17 is pressed against the nozzle plate 15, the elastic member 17*a* is compressed so that the needle valve 17 securely closes the nozzle 14. A bearing portion 21 is provided between the needle valve 17 and the housing 11. A sealing member 22 such as an O-ring is provided between the bearing portion 21 and the needle valve 17.

The piezoelectric element 18 is housed in an inner space 11*a* of the housing 11. A holding member 23 holds the piezoelectric element 18 in a central space 23*a*. The piezoelectric element 18 and the needle valve 17 are coaxially coupled through a distal end portion 23*b* of the holding member 23. The holding member 23 is coupled to the needle valve 17 on the distal end portion 23*b* side and is secured by the regulation member 19 attached to the housing 11 on a rear end portion 23*c* side.

When the drive controller 40 applies the voltage to the piezoelectric element 18, the piezoelectric element 18 contracts and pulls the needle valve 17 through the holding member 23. This causes the needle valve 17 to separate from the nozzle 14 and open the nozzle 14. Accordingly, the ink supplied under pressure to the channel 16 is discharged through the nozzle 14. When no voltage is applied to the piezoelectric element 18, the needle valve 17 closes the nozzle 14. In this state, no ink is discharged through the nozzle 14 even when the ink is supplied under pressure to the channel 16.

The drive controller 40 includes a waveform generation circuitry 41, which is a drive pulse generation unit, and an amplification circuitry 42. The waveform generation circuitry 41 generates a drive pulse waveform described below, and the amplification circuitry 42 amplifies the voltage value to an appropriate value. The amplified voltage is then applied to the piezoelectric element 18. With this voltage application, the drive controller 40 controls the needle valve 17 to be opened and closed and controls the discharge of the ink from the liquid discharge head. When the waveform generation circuitry 41 may apply a sufficient voltage value, the amplification circuitry 42 may be omitted.

The waveform generation circuitry 41 generates a drive pulse that is a waveform associated with the voltage applied to the piezoelectric element 18 over time. The waveform generation circuitry 41 receives input print data from an external personal computer (PC) or microcontroller inside the apparatus and generates the drive pulse based on the input data. The waveform generation circuitry 41 may change the voltage applied to the piezoelectric element 18 and may generate a plurality of drive pulses. As described above, the waveform generation circuitry 41 generates the drive pulse so that the piezoelectric element 18 expands and contracts in response to the drive pulse to open and close the needle valve 17.

Figure 4:
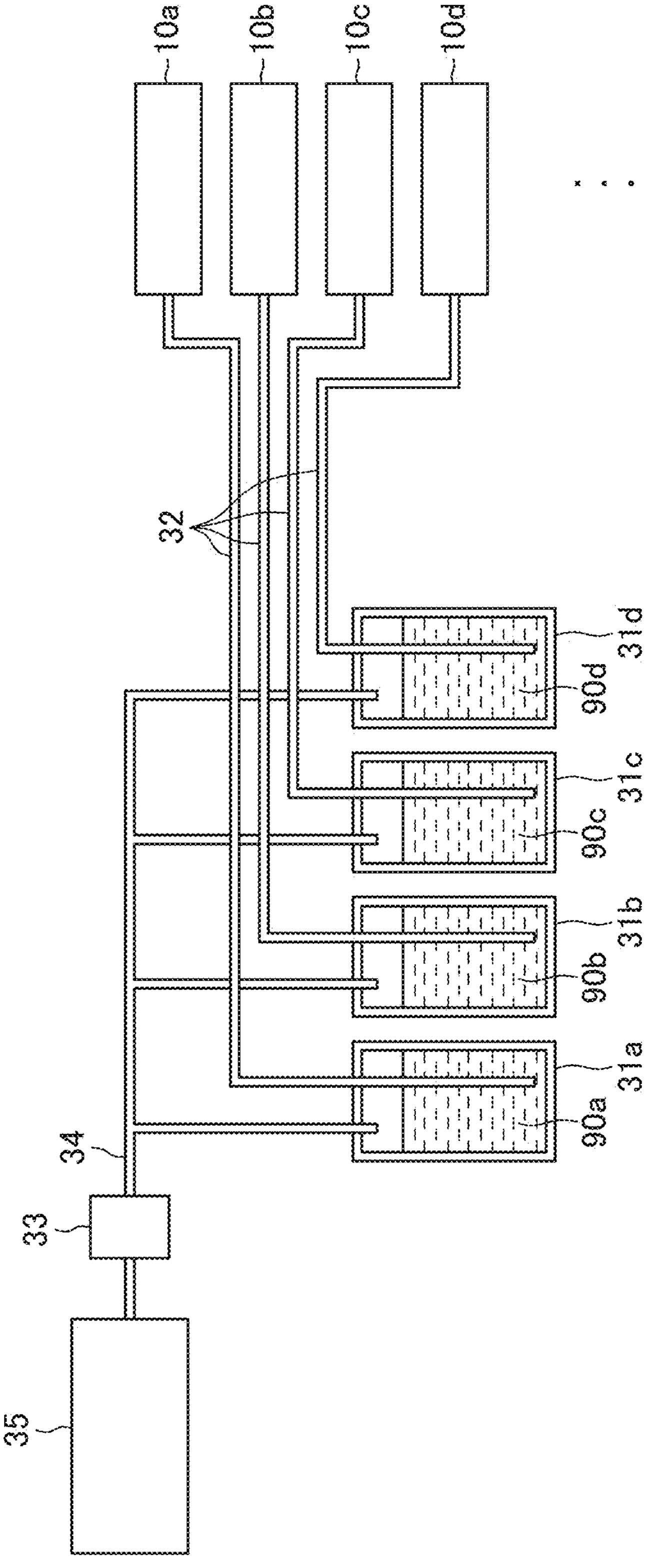
FIG. 4 is a schematic view of an example of a liquid supply unit.

FIG. 4 is a schematic configuration diagram illustrating an example of a liquid supply unit.

The liquid discharge apparatus includes tanks 31*a* to 31*d* as sealed containers containing inks 90*a* to 90*d* to be discharged from liquid discharge heads 10*a* to 10*d*. In the following description, the inks 90*a* to 90 are collectively referred to as "ink 90". The tanks 31*a* to 31*d* are collectively referred to as "tank 31".

The tank 31 and an inlet port (the supply ports 12 illustrated in FIGS. 1 and 2) of the liquid discharge head 10 are coupled to each other via a tube 32. Furthermore, the tank 31 is coupled to a compressor 35 through a pipe 34 including an air regulator 33. The compressor 35 supplies the pressurized air to the tank 31. Accordingly, the ink 90 in the liquid discharge head 10 becomes pressurized, and when the above-described needle valve is opened, the ink 90 is discharged through the nozzle 14. Here, the compressor 35, the pipe 34 including the air regulator 33, the tank 31, and the tube 32 are examples of a liquid supply unit that supplies the ink 90 under pressure to the liquid discharge head 10.

Figure 5:
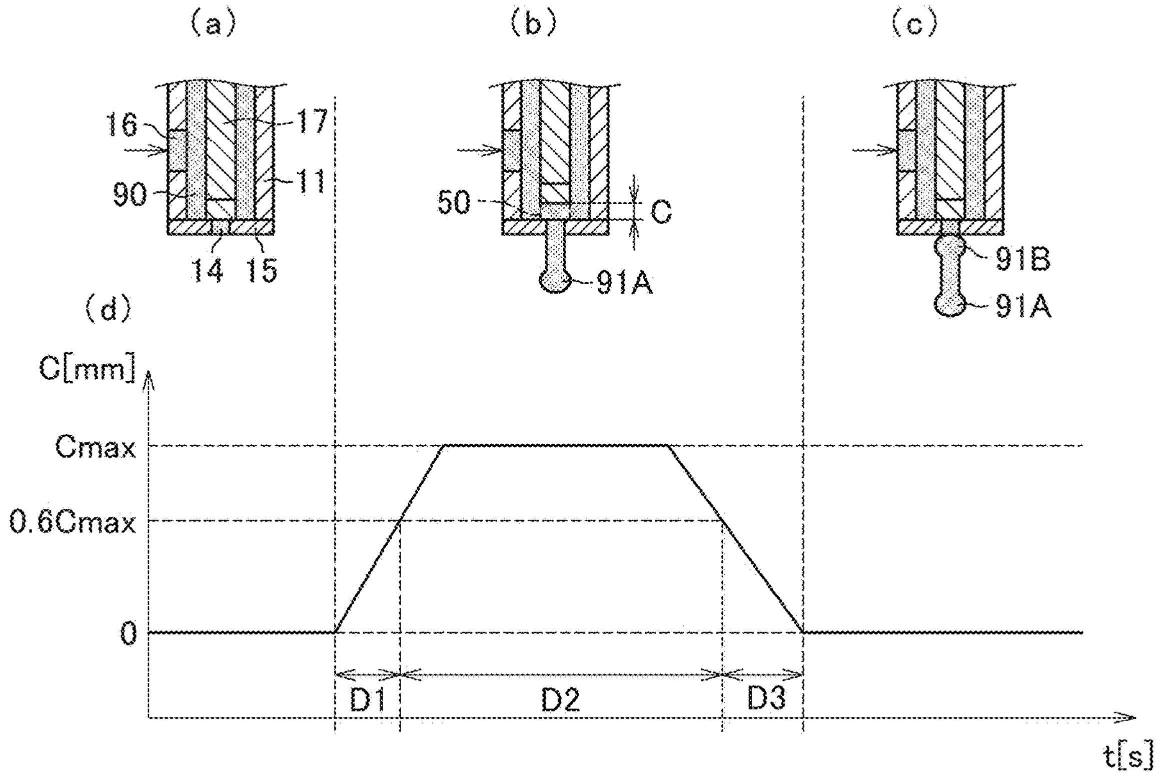
FIGS. 5(*a*) to 5(*c*) are diagrams illustrating an example of discharge of ink by an opening and closing operation of a needle valve, and FIG. 5(*d*) is a graph illustrating an example of a drive pulse at that time.

Next, FIGS. 5(*a*) to 5(*c*) are used to illustrate how the drive controller 40 applies the voltage to the piezoelectric element 18 to drive the needle valve 17. FIGS. 5(*a*) to 5(*c*) illustrate how the needle valve is opened and closed, and FIG. 5(*d*) illustrates the displacement amount of the needle valve at that time. The horizontal axis represents time t [s], and the vertical axis represents a displacement amount C [mm] of the needle valve. The displacement amount of the needle valve described here represents the movement amount of the needle valve 17 in an opening direction that is an upward direction in FIG. 5(*a*) from the position, used as zero, of FIG. 5(*a*) in which the needle valve 17 is in contact with the nozzle plate 15 and the needle valve 17 closes the nozzle 14.

The drive controller 40 applies the drive pulse, which is a pulse of the voltage, to the piezoelectric element 18 to expand and contract the piezoelectric element 18 and drive the opening and closing valve. The drive pulse is proportional to the displacement amount of the needle valve. Specifically, the drive pulse formed by the drive controller 40 relative to the time "t" has the same waveform as that of the transition of the displacement amount of the needle valve relative to the change in the time t in FIG. 5(*d*). Therefore, in the following description, it is assumed that the waveform of the displacement amount C illustrated in FIG. 5(*d*), and the like, is the waveform of the drive pulse (is equal to the waveform of the drive pulse).

While the voltage applied to the piezoelectric element 18 is set to 0 V, the piezoelectric element 18 expands so that the needle valve 17 comes into contact with the nozzle plate 15, as illustrated in FIG. 5(*a*). This causes the needle valve 17 to close the nozzle 14. In FIG. 5(*d*) and the subsequent figures, the displacement amount of the needle valve 17 is 0 when the needle valve 17 closes the nozzle 14, and the displacement amount of the needle valve 17 from this position is the displacement amount C. According to the present embodiment, the voltage is set to 0 V when the nozzle 14 is closed, but a value other than 0 V may be set as long as the voltage is smaller than the predetermined voltage described below.

The application of the voltage to the piezoelectric element 18 contracts the piezoelectric element 18. Accordingly, as illustrated in FIG. 5(*b*), the needle valve 17 moves upward in FIG. 5(*b*), and thus a gap area 50 is formed between the needle valve 17 and the nozzle plate 15. When the application of the voltage to the piezoelectric element 18 is stopped or the applied voltage is reduced, the needle valve 17 comes into contact with the nozzle plate 15 again to close the nozzle 14, as illustrated in FIG. 5(*c*).

As illustrated in FIG. 5(*d*), there are three sections divided as sections of the opening and closing operation by the needle valve 17 described above: an increasing section D1 in which the displacement amount of the needle valve 17 increases, a holding section D2 in which the displacement amount of the needle valve 17 is held in the range from a maximum displacement amount $C_{max}\times0.6$ to the maximum displacement amount $C_{max}$, and a decreasing section D3 in which the displacement amount of the needle valve 17 decreases.

When the nozzle 14 is opened, the compressor 35 (see FIG. 4) applies pressure to the ink 90. Thus, as illustrated in FIG. 5(*b*), the ink is discharged through the nozzle 14 that is opened by the liquid pressure of the ink 90. In the initial period of the increasing section D1, the displacement amount of the needle valve 17 is small and the gap area 50 is also small, and therefore the discharge velocity of the ink is low. Then, in the holding section D2, the displacement amount becomes larger, and the discharge velocity of the ink also becomes higher. As a result, the ink discharged through the nozzle 14 has such a shape that a lump of droplet 91A, which is formed on the downstream side, is pushed out by a line portion that is continuous from the droplet 91A, as illustrated in FIG. 5(*b*). Conversely, in the decreasing section D3, the ink 90 in the gap area 50 is pressurized and pushed out of the nozzle 14 during the process of closing the needle valve 17. Thus, as illustrated in FIG. 5(*c*), another lump of droplet 91B is formed on the upstream side.

Here, in order to stabilize the quality of images formed on the liquid discharge object, it is desirable to stabilize the ink discharge amount and the discharge velocity. However, the discharge conditions, such as the size of ink droplets to be discharged and the discharge cycle of the ink vary from case to case. Therefore, according to the present embodiment, the drive controller generates different drive pulses for each of these conditions.

Here, the discharge amount of the ink through the nozzle is proportional to the liquid pressure of the ink 90 and the opening time of the needle valve 17 and is inversely proportional to the liquid resistance of the gap area 50. Specifically, when Reference Character P represents the liquid pressure, Reference Character $R_{nozzle}$ represents the liquid resistance of the nozzle 14, Reference Character $R_{lift}$ represents the liquid resistance of the gap area 50, Reference Character Δt represents the opening time of the needle valve 17, and the waveform of the drive pulse is rectangular, a discharge amount Q may be obtained by the following Equation (2) below. Alternatively, in a case where the drive pulse is not rectangular, when Reference Character T represents the discharge cycle of the ink, the discharge amount Q may be obtained by the following Equation (3). The liquid pressure of the ink fed to the liquid discharge module is measured by a pressure gauge or the liquid pressure in the tank 31 (see FIG. 4) is measured to obtain the liquid pressure P. The liquid resistance $R_{nozzle}$ may be obtained from the cross-sectional area of the nozzle 14, and the liquid resistance $R_{lift}$ may be obtained from the dimensions of the gap area 50.

[Equation 2]

$$Q = \frac{P}{R_{nozzle} + R_{lift}} \times \Delta t \tag{2}$$

[Equation 3]

$$Q = \int_0^T \frac{P}{R_{nozzle} + R_{lift}(t)} dt \tag{3}$$

The discharge velocity of the ink is proportional to the discharge amount per unit time and is inversely proportional to the cross-sectional area of the nozzle 14. Specifically, when Reference Character S represents the cross-sectional area of the outlet-side opening end of the nozzle 14 and the drive pulse is rectangular, a discharge velocity V may be obtained by the following Equation (4). Alternatively, when the drive pulse is not rectangular, the discharge velocity V may be obtained by the following Equation (5).

[Equation 4]

$$V = \frac{4P}{(R_{nozzle} + R_{lift}) \times S} \tag{4}$$

[Equation 5]

$$V = \frac{\int_0^T \frac{4P}{(R_{nozzle} + R_{lift}) \times S} \times \frac{P}{R_{nozzle} + R_{lift}(t)} dt}{\int_0^T \frac{P}{R_{nozzle} + R_{lift}(t)} dt} \tag{5}$$

Figure 6:
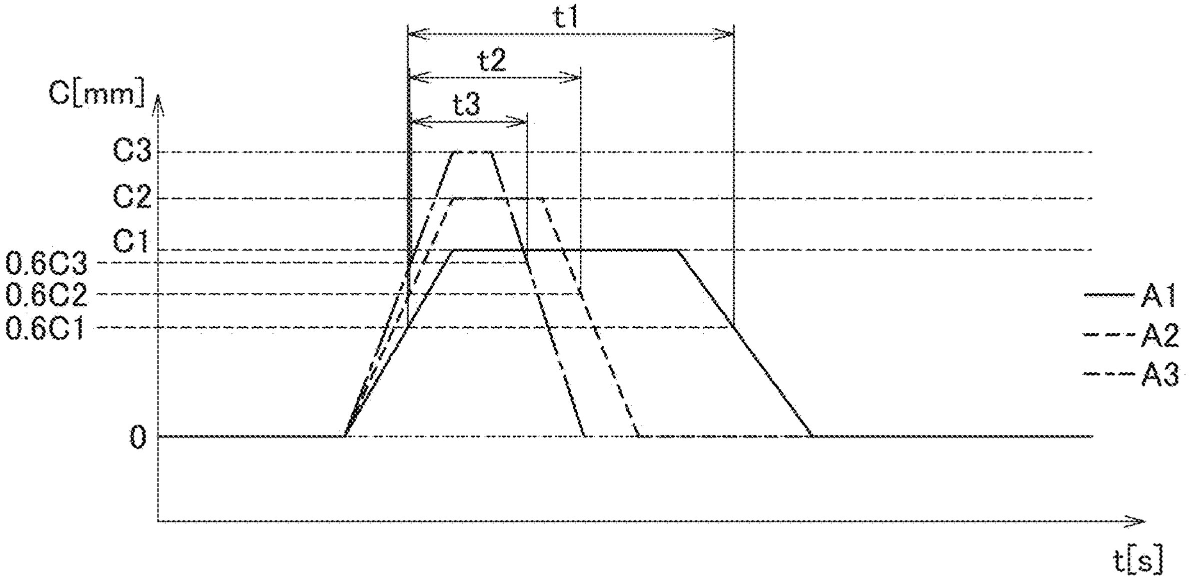
FIG. 6 is a graph illustrating examples of different drive pulses depending on a droplet size.

Here, the drive controller according to the present embodiment generates different drive pulses depending on the size of ink droplet discharged by the liquid discharge head. Specifically, as illustrated in FIG. 6, the drive controller may generate a drive pulse A1 to discharge large droplets, a drive pulse A2 to discharge medium droplets, and a drive pulse A3 to discharge small droplets.

With regard to the holding time during which the needle valve is held in a displaced state at a predetermined displacement amount in each drive pulse, a holding time t1 of the drive pulse A1 is the longest, and a holding time t2 of the drive pulse A2 and a holding time t3 of the drive pulse A3 become shorter in this order. The "predetermined displacement amount" refers to the displacement amount in the range from the maximum displacement amount*0.6 to the maximum displacement amount in the drive pulse, and the "holding time" refers to the section during which the "predetermined displacement amount" is held. Conversely, the average value of the displacement amount in the holding time is the smallest in the drive pulse A1 and becomes larger in the drive pulse A2 and the drive pulse A3 in this order. With regard to the maximum displacement amount, a maximum displacement amount C1 of the drive pulse A1 is the smallest, and a maximum displacement amount C2 of the drive pulse A2 and a maximum displacement amount C3 of the drive pulse A3 become larger in this order. Hereinafter, the maximum displacement amount of the needle valve in each drive pulse is also simply referred to as "maximum displacement amount", and the holding time in the displaced state at the predetermined displacement amount is also simply referred to as "holding time". The time when the needle valve is displaced to the maximum is also the time when the drive controller applies the maximum voltage to the piezoelectric element 18. The holding time is also a holding time in the state of applying the predetermined voltage. The predetermined voltage is a voltage in the range of the maximum voltage value*0.6 to the maximum voltage value.

The larger the maximum displacement amount, the larger the width of the path through which the ink passes, and the higher the discharge velocity of the ink discharged through the nozzle 14. Furthermore, the longer the holding time at the predetermined displacement amount, the larger the amount of ink discharged and the higher the discharge velocity of the ink. Therefore, according to the present embodiment, the larger the droplet to be discharged, the longer the holding time and the larger the discharge amount of the ink. On the other hand, when the droplets to be discharged are small, the average value of the displacement amount in the holding time is increased, and thus the discharge velocity is increased. Thus, the discharge velocity in each drive pulse is substantially identical. That is, the drive pulses are selectively used according to the present embodiment, the ink may be discharged at substantially the constant velocity regardless of the size of the discharged droplet, and the discharge state of the ink from the liquid discharge head may be stabilized. Thus, the quality of the images formed on the liquid discharge object may be improved.

As described above, the drive controller according to the present embodiment may generate a plurality of drive pulses corresponding to the size of droplet to be discharged. Furthermore, the drive pulses may include at least two drive pulses and may include four or more drive pulses. Among these drive pulses, a certain drive pulse (e.g., the drive pulse A1) may be a first drive pulse according to the present embodiment, and a drive pulse (e.g., the drive pulse A3) having a large average value of the displacement amount in the holding time of the needle valve and a short holding time as compared with the first drive pulse may be a second drive pulse according to the present embodiment.

Figure 7:
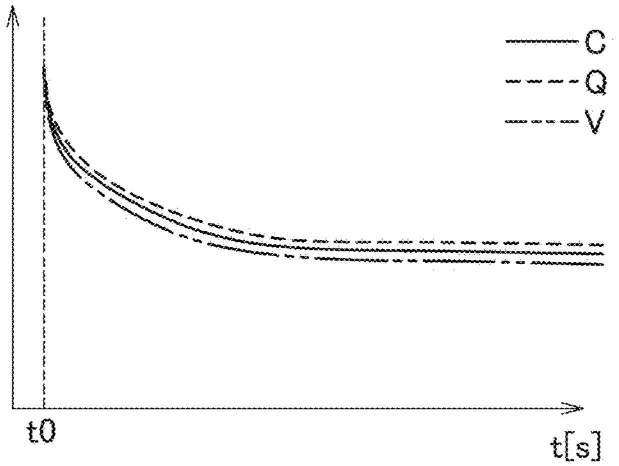
FIG. 7 is a graph illustrating an example of changes in a piezoelectric element due to contraction over time.

The piezoelectric element 18 generates heat due to the applied voltage. Therefore, the application of a high voltage or the continuous high-frequency driving causes the piezoelectric element 18 to contract due to the negative thermal expansion coefficient of the piezoelectric element 18, which results in a reduction of the displacement amount of the needle valve 17. For example, as illustrated in FIG. 7, when high-voltage driving continues from time t0, the thermal contraction of the piezoelectric element 18 reduces the displacement amount C of the needle valve and consequently reduces the discharge amount Q of the ink and also the discharge velocity V.

Figure 8:
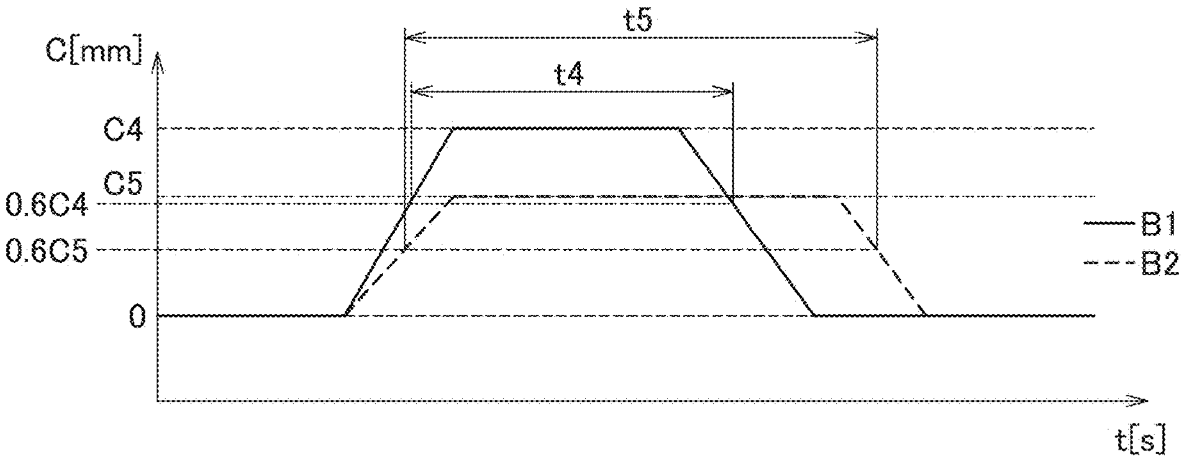
FIG. 8 is a graph illustrating examples of different drive pulses depending on a drive cycle.

Conversely, according to the present embodiment, the drive controller may generate a plurality of drive pulses having different amount of heat generation of the piezoelectric element. Specifically, as illustrated in FIG. 8, the drive controller may generate a drive pulse B1 as the second drive pulse and a drive pulse B2 as the first drive pulse. A maximum displacement amount C4 of the drive pulse B1 is larger than a maximum displacement amount C5 of the drive pulse B2. The average value of the displacement amount of the drive pulse B1 in the holding time is larger than the average value of the displacement amount of the drive pulse B2 in the holding time. A holding time t4 of the drive pulse B1 is shorter than a holding time t5 of the drive pulse B2.

The drive controller according to the present embodiment generates the drive pulse B1 when the drive frequency of the needle valve is high and generates the drive pulse B2 when the drive frequency of the needle valve is low. The drive pulse B1 and the drive pulse B2 are set to have substantially identical areas, and the discharge amount is substantially identical.

From the viewpoint of suppression of the amount of heat generation of the piezoelectric element, it is preferable to use the drive pulse B2 having a smaller average value of the displacement amount in the holding time (i.e., a lower voltage applied). However, the drive pulse B2 has a disadvantage such that the needle valve opens and closes in a longer time, and it is difficult to respond to high-speed printing. Therefore, according to the present embodiment, as described above, the drive pulse B2, which causes a smaller amount of heat generation of the piezoelectric element, is generated when the drive frequency is low and generates the drive pulse B1 when the drive frequency is high. Thus, it is possible to suppress thermal contraction of the piezoelectric element to stabilize the discharge amount and the discharge velocity of the ink through the nozzle and also to respond to high-frequency driving of the needle valve. The configuration may also be such that three or more drive pulses may be generated for each drive frequency.

Figure 9A:
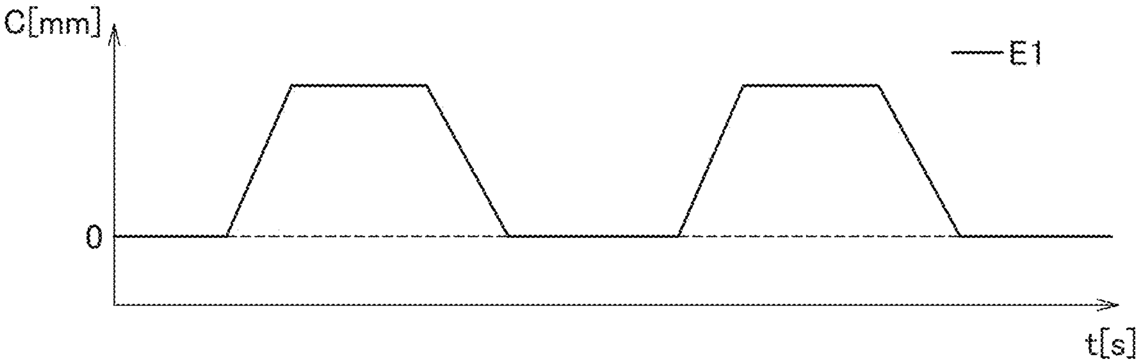
FIGS. 9A and 9B illustrate an example of a drive pulse to discharge the ink to adjacent locations.
Figure 9B:
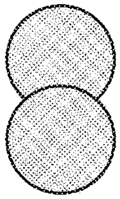
Figure 10A:
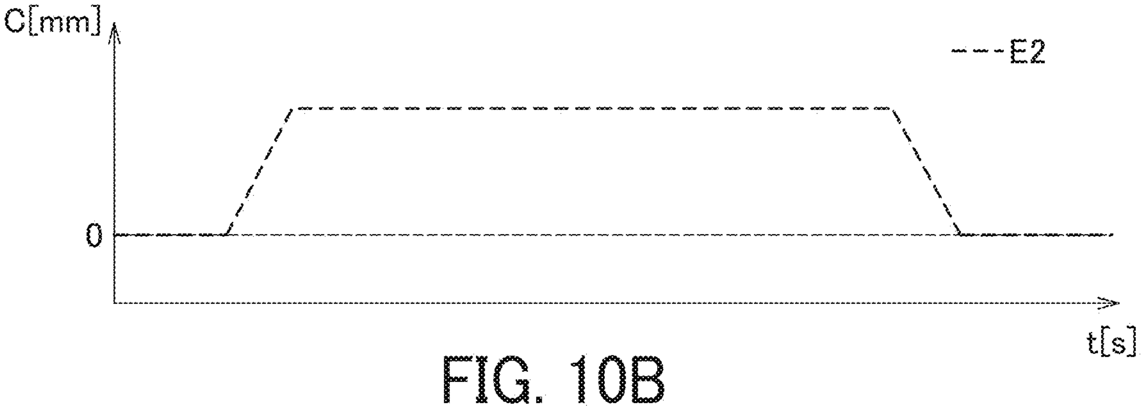
FIGS. 10A and 10B illustrate an example of a drive pulse different from that in FIGS. 9A and 9B to discharge the ink to adjacent locations.
Figure 10B:
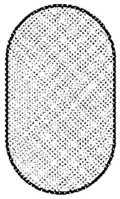

Furthermore, from the viewpoint of suppression of heat generation of the piezoelectric element 18, it is also effective to reduce the number of times the needle valve is opened and closed. Specifically, when the ink is discharged to two adjacent locations on the liquid discharge object, the drive controller according to the present embodiment may generate a drive pulse E1 that is a multiple drive pulse for opening and closing the needle valve each time, as illustrated in FIG. 9A, to individually form the droplet to be discharged at each of the locations, as illustrated in FIG. 9B. Conversely, the drive controller according to the present embodiment may generate a drive pulse E2 that is a single drive pulse for opening and closing the needle valve once and keeping the needle valve open, as illustrated in FIG. 10A, to form a line-like droplet that is discharged over two locations, as illustrated in FIG. 10B. With the drive pulse E2, it is possible to suppress thermal contraction of the piezoelectric element to stabilize the discharge amount and the discharge velocity of the ink through the nozzle. Furthermore, as the ink is applied to adjacent ink discharge locations with a line-like droplet, it is possible to prevent the ink from being splattered on the liquid discharge object at the time of landing and to prevent uneven film thickness.

In the drive pulse E1, opening and closing the needle valve each time means that the operation to raise the voltage applied to the drive element from 0 V to a predetermined voltage and then lower the voltage to 0 V is performed as many times as the number of discharge locations. Furthermore, in the drive pulse E2, opening and closing the needle valve once means that the voltage applied to the drive element is raised to a predetermined voltage, held, and then lowered to 0V. To continuously discharge the ink to three or more locations on the liquid discharge object, the needle valve may be opened and closed once to discharge the ink to all of these locations.

Figures 11A, 11B:
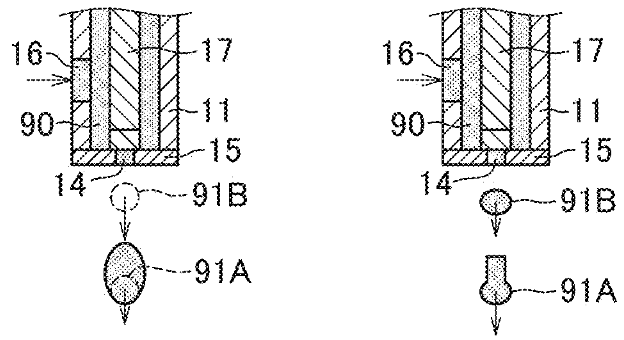
FIGS. 11A and 11B illustrate examples of the ink discharged through a nozzle.

Furthermore, as illustrated in FIG. 5(*c*), the ink discharged through the nozzle includes the droplet 91A on the downstream side in the discharge direction formed by the liquid pressure of the ink and the droplet 91B on the upstream side in the discharge direction formed by the pressure to close the opening and closing valve. When the velocity of the droplet 91B on the upstream side is higher than the velocity of the droplet 91A on the downstream side after these droplets are discharged through the nozzle 14, the droplet 91B on the upstream side catches up with the droplet 91A on the downstream side to become one large droplet, as illustrated in FIG. 11A. Conversely, as illustrated in FIG. 11B, when the velocity of the droplet 91B on the upstream side is equal to or less than the velocity of the droplet 91A on the downstream side, the two droplets 91A and 91B are separated or become an elongated line-like droplet.

In the case of FIG. 11A, the ink discharged through the nozzle becomes a single, nearly spherical droplet, and thus it is possible to stabilize the discharge state for the liquid discharge object and to form a desirable image on the liquid discharge object. Conversely, in the case of FIG. 11B, the droplets land twice on the same location and the successive droplets 91A and 91B interfere with each other, which results in a printing failure such as an unstable image formed on the liquid discharge object. That is, as illustrated in FIG. 11A, the velocity of the droplet 91B on the upstream side is preferably higher than the velocity of the droplet 91A on the downstream side so as to stabilize the discharge state of the ink through the nozzle.

Figure 12:
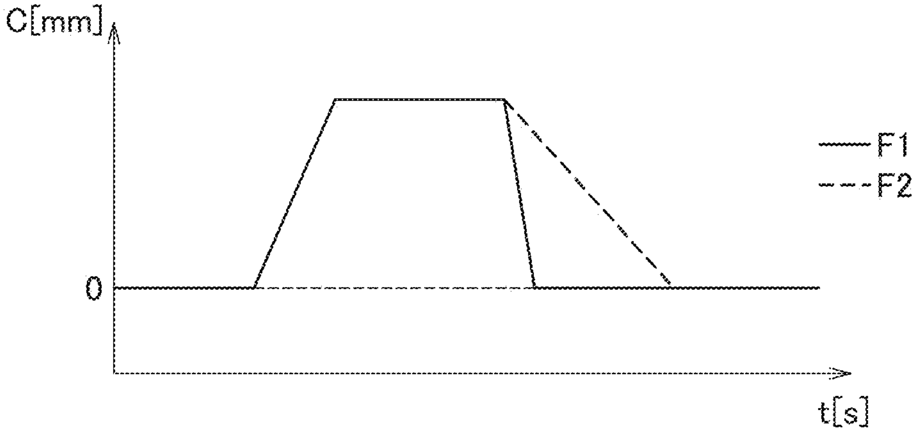
FIG. 12 is a graph illustrating examples of a plurality of drive pulses having different velocities to close the needle valve.

Conversely, the drive controller according to the present embodiment may generate a plurality of drive pulses to change the velocity to close the needle valve 17. Specifically, as illustrated in FIG. 12, the drive controller may generate a drive pulse F1, in which the velocity (a decreasing slope illustrated in FIG. 12) to close the needle valve 17 is higher, and a drive pulse F2, in which the slop is lower and the velocity to close the needle valve 17 is lower.

For the drive pulse F1, in which the velocity to close the needle valve 17 is higher, the slope is set such that the velocity of the droplet 91B on the upstream side is higher than the velocity of the droplet 91A on the downstream side, as illustrated in FIG. 11A. Thus, the ink discharge state may be stabilized as described above. Specifically, when Reference Character $SR_{bulb}$ represents the slew rate, which is the velocity to close the needle valve 17, the slew rate $SR_{bulb}$ is set to be equal to or more than the discharge velocity V represented by the above-described Equation (4) and is set to satisfy the following Equation (6). Three or more drive pulses having different slew rates may be generated.

[Equation 6]

$$SR_{bulb} \geq \frac{4P}{(R_{nozzle} + R_{lift}) \times S} \tag{6}$$

The above-described slew rate $SR_{bulb}$ is also the velocity at which the voltage applied to the drive element is lowered from the predetermined voltage to 0 V.

In the above description, one of the set drive pulses is selected, but the numeric value may be adjusted for setting. For example, according to the embodiment in FIG. 6, the value of the displacement amount may be set to any value such that the larger the average value of the displacement amount in the holding time, the shorter the holding time at the predetermined displacement amount. For example, according to the embodiment in FIG. 12, the slew rate may be set to any value. A composite drive pulse may be generated in combination of the following conditions: the difference in the drive pulse due to the droplet in FIG. 6, the difference in the drive pulse due to the drive frequency in FIG. 8, the selection of the drive pulse for continuous discharge in FIG. 9A, and the difference in the slew rate in the drive pulse in FIG. 12.

Next, an example of the process by which the drive controller generates the drive pulse for a certain nozzle will be described using the flowchart in FIG. 13.

Figure 13:
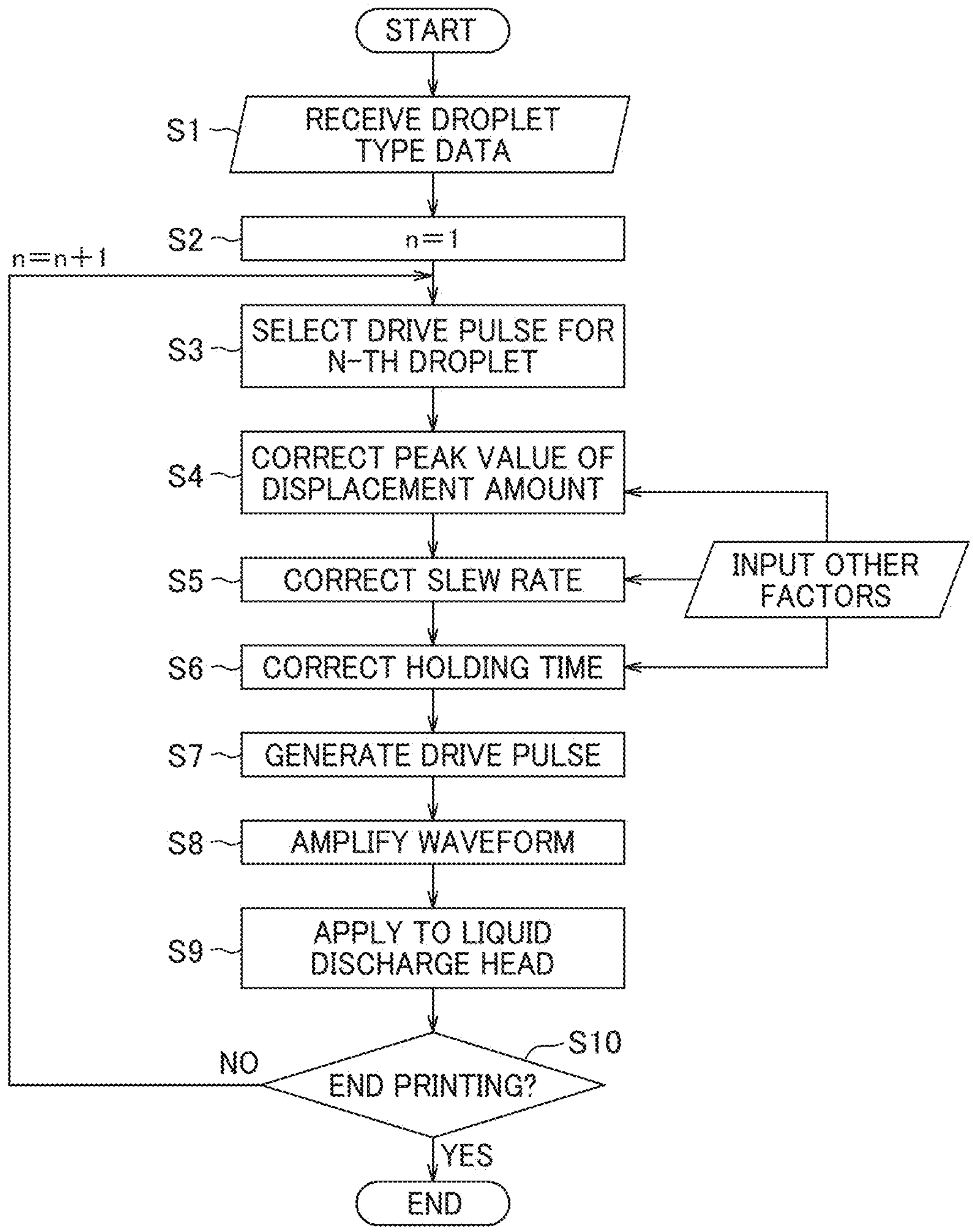
FIG. 13 is a flowchart illustrating an example of a process performed by a drive controller to generate a drive pulse.

As illustrated in FIG. 13, data on the size of the droplet to be discharged through the nozzle is first received from an external PC or microcontroller in the apparatus (Step S1). Then, based on the data, a first drive pulse is selected (Steps S2 and S3). According to the present embodiment, first, one of the fixed drive pulses is selected based on the size of the droplet. Then, based on disturbance factors, e.g., ambient temperature, and other factors such as the drive cycle and the viscosity of the ink in consideration of changes over time, the maximum displacement amount of the needle valve, the slew rate, and the holding time at the predetermined displacement amount of the needle valve are each corrected (Steps S4 to S6). Then, the drive pulse is generated by the waveform generation circuitry 41 (see FIG. 3A), the waveform is amplified by the amplification circuitry 42, and the voltage is applied to the piezoelectric element of the liquid discharge head (Steps S7 to S9). Then, the flow of Steps S3 to S9 is repeated until ink discharge through this nozzle is finished (S10).

As described above, the drive controller according to the present embodiment may generate appropriate drive pulses in accordance with the discharge condition, such as the size of droplet to be discharged and the drive cycle. Therefore, the discharge state of the ink from the liquid discharge head may be stabilized, e.g., the discharge amount and the discharge velocity of the ink through the nozzle may be stabilized. Thus, the quality of images formed on the liquid discharge object may be improved.

In the example described according to the present embodiment above, the displacement amount increases to the maximum value and remains constant, but the configuration may be such that the displacement amount fluctuates or oscillates within −40% of the maximum value of the displacement amount in the holding time. Similarly, in the example described according to the present embodiment above, the voltage continuously increases to the maximum value and then maintains the maximum value, but a configuration may be such that the voltage fluctuates or oscillates within −40% of the maximum voltage value in the holding time.

Next, the liquid discharge apparatus that includes the head device including the above drive controller will be described using FIG. 14.

Figure 14:
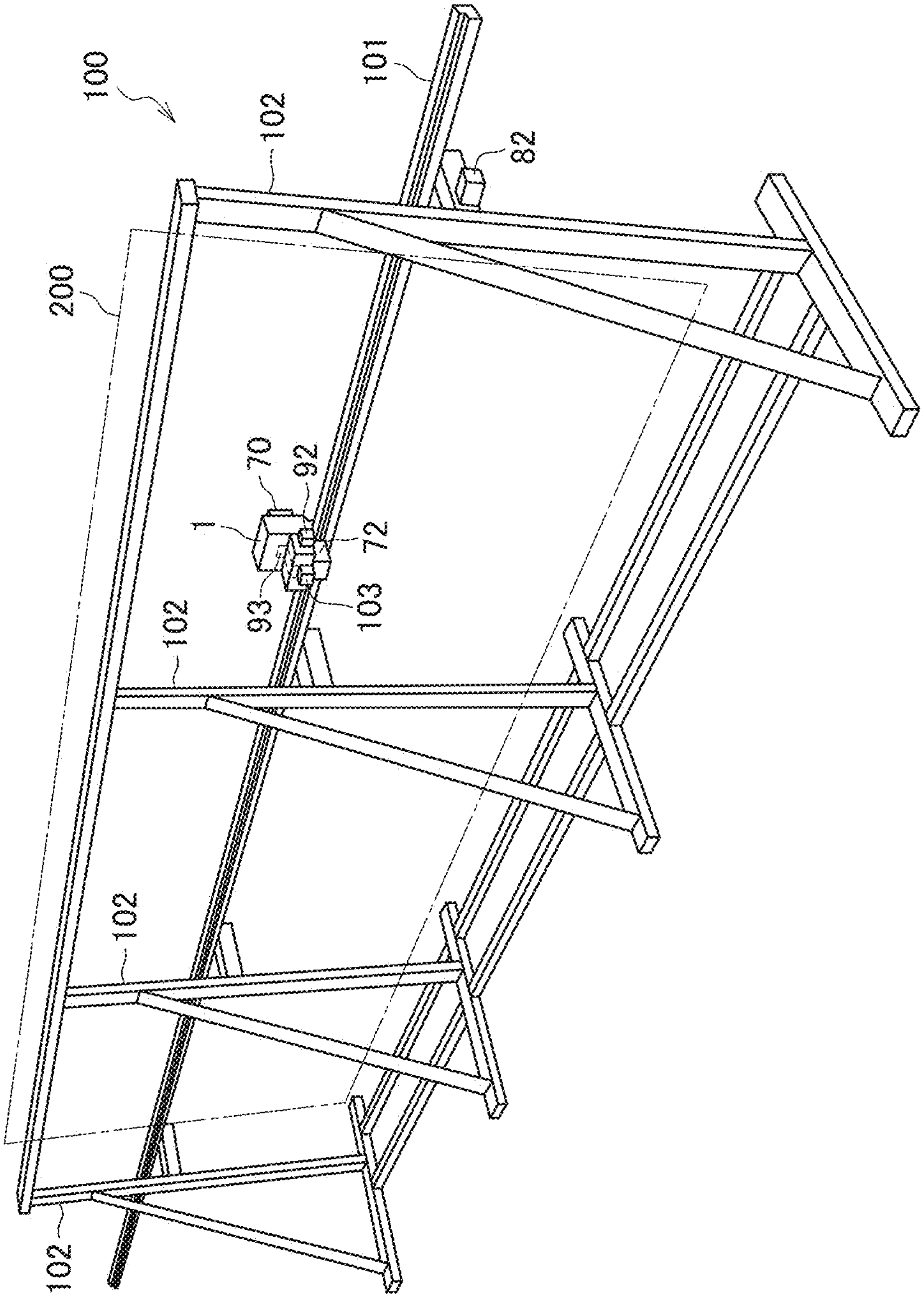
FIG. 14 is a perspective view of an example of a liquid discharge apparatus.

As illustrated in FIG. 14, a liquid discharge apparatus 100 is installed facing a liquid discharge object 200, which is an example of an object. The liquid discharge apparatus 100 includes an X-axis rail 101, a Y-axis rail 102, and a Z-axis rail 103. The Y-axis rail 102 intersects the X-axis rail 101. The Z-axis rail 103 intersects the X-axis rail 101 and the Y-axis rail 102.

The Y-axis rail 102 holds the X-axis rail 101 such that the X-axis rail 101 may move in a Y-direction. The X-axis rail 101 holds the Z-axis rail 103 such that the Z-axis rail 103 may move in an X-direction. The Z-axis rail 103 holds a carriage 1 such that the carriage 1 may move in a Z-direction. Here, the carriage 1 is an example of a head device and includes the drive controller and the liquid discharge head described above.

The liquid discharge apparatus 100 includes a first Z-direction drive unit 92 that moves the carriage 1 along the Z-axis rail 103 in the Z-direction, and an X-direction drive unit 72 that moves the Z-axis rail 103 along the X-axis rail 101 in the X-direction. Further, the liquid discharge apparatus 100 includes a Y-direction drive unit 82 that moves the X-axis rail 101 along the Y-axis rail 102 in the Y-direction. Furthermore, the liquid discharge apparatus 100 includes a second Z-direction drive unit 93 that moves a head holder 70 relative to the carriage 1 in the Z-direction.

The carriage 1 includes the head holder 70. The head holder 70 is an example of a holder. The carriage 1 may move in the Z-direction along the Z-axis rail 103 due to the power from the first Z-direction drive unit 92 illustrated in FIG. 14. The head holder 70 may move in the Z-direction relative to the carriage 1 due to the power from the second Z-direction drive unit 93 illustrated in FIG. 14.

The liquid discharge apparatus 100 having the above-described configuration discharges the ink, which is an example of the liquid, from the head provided in the head holder 70 to draw on the liquid discharge object 200 while moving the carriage 1 in the X-axis, Y-axis, and Z-axis directions. Here, the movement of the carriage 1 and the head holder 70 in the Z-direction need not be parallel to the Z-direction, but may be a diagonal movement as long as the movement includes at least a component in the Z-direction.

Although the surface shape of the liquid discharge object 200 is illustrated as a flat surface in FIG. 14, the surface shape of the liquid discharge object 200 may be a surface similar to a vertical, such as a car or truck body or an aircraft body, or a surface having a large radius of curvature.

The embodiment of the present disclosure has been described above, but the present disclosure is not limited to the embodiment above, and it is obvious that various changes may be made without departing from the scope of the present disclosure.

The "liquid" includes paint as well as ink.

In the above-described embodiment, the drive controller applies the voltage to the drive element such as the piezoelectric element to open and close an opening and closing valve. However, the present embodiment is not limited thereto, and the opening and closing valve may be opened and closed by pneumatic or hydraulic pressure. In this case, the drive pulse generated by the drive controller has a drive waveform to drive a pressure mechanism using the pneumatic or hydraulic pressure at a set pressure.

In this application, the "liquid discharge apparatus" is an apparatus that includes the liquid discharge head or the head device to drive the liquid discharge head and discharge the liquid. The "liquid discharge apparatus" includes, in addition to apparatuses to discharge the liquid to materials to which the liquid may adhere, apparatuses to discharge the liquid into gas (air) or liquid.

The "liquid discharge apparatus" may include apparatuses to feed, convey, and eject the material to which the liquid may adhere. The liquid discharge apparatus may further include a pretreatment apparatus, a post-treatment apparatus, etc.

The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The "liquid discharge apparatus" is not limited to an apparatus to discharge liquid to visualize meaningful images, such as letters or figures. For example, the liquid discharge apparatus may be an apparatus to form arbitrary images, such as arbitrary patterns, or fabricate three-dimensional images.

The "material to which the liquid may adhere" refers to the above-described liquid discharge object, the material to which the liquid may at least temporarily adhere, the material to which the liquid adheres and sticks, and the material to which the liquid adheres and penetrates, etc. Examples of the "material to which the liquid may adhere" include recording media, such as paper, recording paper, recording sheet, film, and cloth, electronic component, such as electronic substrate and piezoelectric element, and media, such as powder layer, organ model, and testing cell. The "material to which the liquid may adhere" includes any material to which the liquid may adhere, unless particularly limited.

Examples of the "material to which the liquid may adhere" include any materials to which the liquid may adhere even temporarily, such as paper, thread, fiber, fabric, leather, metal, plastic, glass, wood, and ceramic.

The "liquid discharge apparatus" may be an apparatus to relatively move the liquid discharge head and the material to which the liquid may adhere. However, the liquid discharge apparatus is not limited to such an apparatus. For example, the liquid discharge apparatus may be a serial head apparatus that moves the liquid discharge head or a line head apparatus that does not move the liquid discharge head.

Examples of the "liquid discharge apparatus" further include: a treatment liquid applying apparatus that discharges a treatment liquid onto paper to apply the treatment liquid to the surface of the paper for reforming the surface of the paper; and an injection granulation apparatus that injects a composition liquid, in which a raw material is dispersed in a solution, through a nozzle to granulate fine particle of the raw material.

The terms "image formation", "recording", "printing", "image printing", and "fabricating" used herein may be used synonymously with each other.

The functionality of the elements disclosed herein such as the head drive controller 400 may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Aspect 1

A drive controller includes: circuitry configured to: drive a liquid discharge head, including a discharge port and a valve to open and close the discharge port, to discharge a liquid from the discharge port, generate a drive pulse to drive the valve to open and close the discharge port; and the drive pulse including: a first drive pulse to hold the valve at a first displacement amount for a first holding time; and a second drive pulse to hold the valve at a second displacement amount for a second holding time, wherein the second holding time is shorter than the first holding time, and a second average value of the second displace amount is larger than a first average value of the first displace amount.

Aspect 2

In the drive controller according to aspect 1, the circuitry is further configured to: drive the liquid discharge head to discharge the liquid to at least two adjacent locations of a liquid discharge object; and generate multiple drive pulse and a single drive pulse, and the multiple drive pulse opens and closes the valve a number of times equal to a number of the at least two adjacent locations onto which the liquid is individually discharged, and the single drive pulse opens and closes the valve once and keep the valve open to discharge droplets across the at least two adjacent locations.

Aspect 3

In the drive controller according to aspect 1 or 2, the circuitry is configured to generate multiple drive pulses to close the valve at different velocities.

Aspect 4

In the drive controller according to any one of aspect 1 to 3, the drive pulse has: an increasing section to open the valve from a closed state to the first displacement amount or the second displacement amount; a holding section to hold the valve in a displaced state displaced at the first displacement amount or the second displacement amount; and a decreasing section to close the valve from the displaced state, and the circuitry is further configured to generate the drive pulse that cause the liquid discharge head to discharge the liquid from the discharge port at a discharge velocity, and the discharge velocity in the decreasing section is higher than each of the discharge velocity in the increasing section and the holding section.

Aspect 5

In the drive controller according to any one of aspect 1 to 4, the circuitry is further configured to generate the drive pulse that satisfies the following Equation (1), $$SR_{bulb} \geq \frac{4P}{(R_{nozzle} + R_{lift}) \times S} \quad (1)$$

where P represents a pressure of the liquid, S represents a cross-sectional area of an outlet-side opening end of the discharge port, $R_{lift}$ represents a liquid resistance in a gap area between the discharge port and the valve, $R_{nozzle}$ represents a liquid resistance inside the discharge port, and $SR_{bulb}$ represents a velocity to close the valve.

Aspect 6

A drive controller includes circuitry configured to: drive a liquid discharge head, including a discharge port, a valve to open and close the discharge port, and a drive element to drive the valve, to discharge a liquid from the discharge port, generate and apply a drive pulse having a voltage to the drive element to drive the valve to open and close the discharge port; and the drive pulse including: a first drive pulse to hold the voltage applied to the drive element at a first voltage for a first holding time; and a second drive pulse to hold the voltage applied to the drive element at a second voltage for a second holding time, wherein the second holding time is shorter than the first holding time, and a second average value of the second voltage is larger than a first average value of the first voltage.

Aspect 7

In the drive controller according to aspect 6, the drive pulse has: an increasing section to increase the voltage to the first voltage or the second voltage; a holding section to hold the voltage at the first voltage or the second voltage; and a decreasing section to decrease the voltage from the first voltage or the second voltage; wherein the circuitry is further configured to: drive the liquid discharge head to discharge the liquid to at least two adjacent locations of a liquid discharge object; and generate multiple drive pulse and a single drive pulse, and each of the multiple drive pulse has the increasing section, the holding section, and the decreasing section for a number of the at least two adjacent locations onto which the liquid is individually discharged, and the single drive pulse has one set of the increasing section, the holding section, and the decreasing section to discharge droplets across the at least two adjacent locations.

Aspect 8

In the drive controller according to aspect 6 or 7, the circuitry is further configured to generate multiple drive pulses having different velocities to decrease the voltage from the first voltage or the second voltage in the decreasing section.

Aspect 9

In the drive controller according to any one of aspect 6 to 8, the drive pulse has: an increasing section to increase the voltage to the first voltage or the second voltage; a holding section to hold the voltage at the first voltage or the second voltage; and a decreasing section to decrease the voltage from the first voltage or the second voltage, and the circuitry generates the drive pulse that cause the liquid discharge head to discharge the liquid from the discharge port at a discharge velocity, and the discharge velocity in the decreasing section is higher than each of the discharge velocity in the increasing section and the holding section.

Aspect 10

In the drive controller according to any one of aspect 6 to 9, the circuitry is further configured to generate the drive pulse that satisfies the following Equation (1), $$SR_{bulb} \geq \frac{4P}{(R_{nozzle} + R_{lift}) \times S} \quad (1)$$

where P represents a pressure of the liquid, S represents a cross-sectional area of an outlet-side opening end of the discharge port, $R_{lift}$ represents a liquid resistance in a gap area between the discharge port and the valve, $R_{nozzle}$ represents a liquid resistance inside the discharge port, and $SR_{bulb}$ represents a velocity to decrease the voltage from the first voltage or the second voltage.

Aspect 11

In the drive controller according to any one of aspects 1 to 10, the circuitry is further configured to: cause the liquid discharge head to discharge multiple droplets having different sizes; generate the first drive pulse to cause the liquid discharge head to discharge a first droplet having a first size; and generate the second drive pulse to cause the liquid discharge head to discharge a second droplet having a second size smaller than the first size.

Aspect 12

In the drive controller according to any one of aspects 1 to 11, the circuitry is further configured to: generate the first drive pulse to cause the liquid discharge head to discharge the liquid in a first cycle, and generate the second drive pulse to cause the liquid discharge head to discharge the liquid in a second cycle shorter than the first cycle.

Aspect 13

A head device includes: the drive controller according to any one of aspects 1 to 12; and the liquid discharge head.

Aspect 14

A head device includes: a liquid discharge head, including a discharge port and a valve to open and close the discharge port, to discharge a liquid from the discharge port; and a drive controller configured to control to drive the valve, the drive controller including circuitry configured to: drive the liquid discharge head to discharge the liquid from the discharge port, generate a drive pulse to drive the valve to open and close the discharge port; and the drive pulse including: a first drive pulse to hold the valve at a first displacement amount for a first holding time; and a second drive pulse to hold the valve at a second displacement amount for a second holding time, wherein the second holding time is shorter than the first holding time, and a second average value of the second displace amount is larger than a first average value of the first displace amount.

Aspect 15

A head device includes: a liquid discharge head including a discharge port, a valve to open and close the discharge port, and a drive element to drive the valve, to discharge a liquid from the discharge port; and a drive controller configured to generate and apply a drive pulse having a voltage to the drive element to drive the valve to open and close the discharge port, the drive controller including: circuitry configured to: apply a first drive pulse to the drive element to hold the voltage at a first voltage for a first holding time; and apply a second drive pulse to the drive element to hold the voltage at a second voltage for a second holding time, wherein the second holding time is shorter than the first holding time, and a second average value of the second voltage is larger than a first average value of the first voltage.

Aspect 16

In the head device according to aspect 14 or 15, the circuitry is further configured to: cause the liquid discharge head to discharge multiple droplets having different sizes; generate the first drive pulse to cause the liquid discharge head to discharge a first droplet having a first size; and generate the second drive pulse to cause the liquid discharge head to discharge a second droplet having a second size smaller than the first size.

Aspect 17

In the head device according to aspect 14 or 15, the circuitry is further configured to: generate the first drive pulse to cause the liquid discharge head to discharge the liquid in a first cycle, and generate the second drive pulse to cause the liquid discharge head to discharge the liquid in a second cycle shorter than the first cycle.

Aspect 18

A liquid discharge apparatus includes the head device according to any one of aspects 1 to 17. This patent application is based on and claims priority to Japanese Patent Application No. 2022-032747, filed on Mar. 3, 2022, in the Japan Patent Office, the entire disclosure of which is hereby incorporated by reference herein.

REFERENCE SIGNS LIST

10 Liquid discharge head
14 Nozzle (discharge port)
15 Nozzle plate (discharge port forming member)
17 Needle valve (opening and closing valve)
18 Piezoelectric element (drive element)
30 Liquid discharge module
40 Drive controller
41 Waveform generation circuitry (drive pulse generation unit)
50 Gap area
60 Head device
100 Liquid discharge apparatus
C Displacement amount of needle valve
Cmax Maximum displacement amount of needle valve
D1 Increasing section
D2 Holding section
D3 Decreasing section

The invention claimed is:

1. A drive controller comprising:
circuitry configured to,
drive a liquid discharge head to discharge a liquid from a discharge port, the liquid discharge head including the discharge port and a valve, and
transmit a plurality of drive pulse signals to the valve, the plurality of drive pulse signals controlling the valve to open and close the discharge port, the plurality of drive pulse signals including,
a first drive pulse signal including a first increasing section, a first holding section, and a first decreasing section, the first drive pulse signal causing the valve to hold at a first displacement amount for a first holding time period corresponding to the first holding section, and
a second drive pulse signal including a second increasing section, a second holding section, and a second decreasing section, the second drive pulse signal causing the valve to hold at a second displacement amount for a second holding time period corresponding to the second holding section, the second holding time period being shorter than the first holding time period, and
an average value of the second displacement amount is larger than an average value of the first displacement amount-, wherein
a speed of the valve in the first increasing section is slower than the speed of the valve in the second increasing section, and
the speed of the valve in the first decreasing section is slower than the speed of the valve in the second decreasing section.

2. The drive controller according to claim 1, wherein the circuitry is further configured to:
drive the liquid discharge head to discharge the liquid to at least two adjacent locations of a liquid discharge object;
transmit the plurality of drive pulse signals to the valve, the plurality of drive pulse signals causing the valve to open and close the valve a number of times equal to a number of the at least two adjacent locations; and
transmit a single drive pulse signal to the valve, the single drive pulse signal causing the valve to open and close the valve once and keep the valve open to discharge droplets across the at least two adjacent locations.

3. The drive controller according to claim 1, wherein the circuitry is further configured to:
transmit the plurality of drive pulse signals to the valve, the plurality of drive pulse signals causing the valve to close at different velocities.

4. The drive controller according to claim 1, wherein
the first increasing section causes the valve to open from a closed state to the first displacement amount,
the second increasing section causes the valve to open from the closed state to the second displacement amount,
the first holding section causes the valve to hold the valve in a first displaced state displaced at the first displacement amount,
the second holding section causes the valve to hold the valve in a second displaced state displaced at the second displacement amount,
the first decreasing section causes the valve to close from the first displaced state, and the second decreasing section causes the valve to close from the second displaced state; and the circuitry is further configured to generate the plurality of drive pulse signals, the plurality of drive pulse signals causing the liquid discharge head to discharge the liquid from the discharge port at a desired discharge velocity;

the desired discharge velocity in the first decreasing section is higher than each of the desired discharge velocities in the first increasing section and the first holding section; and the desired discharge velocity in the second decreasing section is higher than each of the desired discharge velocities in the second increasing section and the second holding section.

5. The drive controller according to claim 1, wherein the circuitry is further configured to:

generate at least one of the first drive pulse signal or the second drive pulse signal, the generated drive pulse signal satisfying the following Equation (1), $$SR_{bulb} \geq \frac{4P}{(R_{nozzle} + R_{lift}) \times S} \tag{1}$$

where P represents a pressure of the liquid,

S represents a cross-sectional area of an outlet-side opening end of the discharge port, $R_{lift}$ represents a liquid resistance in a gap area between the discharge port and the valve, $R_{nozzle}$ represents a liquid resistance inside the discharge port, and $SR_{bulb}$ represents a velocity to close the valve.

6. The drive controller according to claim 1, wherein the liquid discharge head is further configured to:

discharge a first droplet having a first size in response to the first drive pulse signal; and discharge a second droplet having a second size smaller than the first size in response to the second drive pulse signal.

7. The drive controller according to claim 1, wherein the liquid discharge head is further configured to:

discharge the liquid in a first cycle; and discharge the liquid in a second cycle shorter than the first cycle.

8. A head device comprising:

the drive controller according to claim 1; and the liquid discharge head.

9. A drive controller comprising:

circuitry configured to, drive a liquid discharge head, the liquid discharge head including a discharge port, a valve, and a drive element, the driving the liquid discharge head causing the liquid discharge head to discharge a liquid from the discharge port, the drive element configured to open and close the valve, and transmit a plurality of drive pulse signals to the drive element, the plurality of drive pulse signals each having a voltage which causes the drive element to drive the valve to open and close the discharge port, the plurality of drive pulse signals including a first drive pulse signal and a second drive pulse signal, the first drive pulse signal including a first increasing section, a first holding section, and a first decreasing section, and the second drive pulse signal including a second increasing section, a second holding section, and a second decreasing section; and the drive element configured to, hold the voltage at a first voltage for a first holding time period in response to the first holding section of the first drive pulse signal, and hold the voltage at a second voltage for a second holding time period in response to the second holding section of the second drive pulse signal, the second holding time period being shorter than the first holding time period, and an average value of the second voltage being larger than an average value of the first voltage, wherein a rate of voltage change corresponding to the first drive pulse signal is slower than a rate of voltage change corresponding to the second drive pulse signal.

10. The drive controller according to claim 9, wherein the first increasing section causing the voltage to be increased to the first voltage, the first holding section causing the voltage to be held at the first voltage, the first decreasing section causing the voltage to be decreased from the first voltage, the second increasing section causing the voltage to be increased to the second voltage, the second holding section causing the voltage to be held at the second voltage, and the second decreasing section causing the voltage to be decreased from the second voltage; and the circuitry is further configured to, drive the liquid discharge head to discharge the liquid to at least two adjacent locations of a liquid discharge object based on the plurality of drive pulse signals.

11. The drive controller according to claim 9, wherein the circuitry is further configured to:

transmit the plurality of drive pulse signals to the drive element, the plurality of drive pulse signals having different decreasing sections, the different decreasing sections causing different decreases in the voltage from the first voltage or the second voltage.

12. The drive controller according to claim 9, wherein the first increasing section causes the voltage to be increased to the first voltage, the first holding section causes the voltage to be held at the first voltage;

the first decreasing section causes the voltage to be decreased from the first voltage;

the second increasing section causes the voltage to be increased to the second voltage, the second holding section causes the voltage to be held at the second voltage; and the second decreasing section causes the voltage to be decreased from the second voltage; and the circuitry is further configured to, transmit the plurality of drive pulse signals to the drive element, the plurality of drive pulse signals causing the liquid discharge head to discharge the liquid from the discharge port at a desired discharge velocity, and the desired discharge velocity during the first or second decreasing sections is higher than the desired discharge velocity during the first or second increasing sections and the first or second holding sections, respectively.

13. The drive controller according to claim 9, wherein the circuitry is further configured to:

generate at least one of the first drive pulse signal or the second drive pulse signal such that the generated drive pulse signal satisfies the following Equation (1), Equation (1)

$$SR_{bulb} \geq \frac{4P}{(R_{nozzle} + R_{lift}) \times S}, \quad (1)$$

where P represents a pressure of the liquid,

S represents a cross-sectional area of an outlet-side opening end of the discharge port, $R_{lift}$ represents a liquid resistance in a gap area between the discharge port and the valve, $R_{nozzle}$ represents a liquid resistance inside the discharge port, and $SR_{bulb}$ represents a velocity to decrease the voltage from the first voltage or the second voltage.

14. A head device comprising:

the drive controller according to claim 9; and the liquid discharge head.

15. The drive controller according to claim 9, wherein the liquid discharge head is further configured to:

discharge a first droplet having a first size in response to the first drive pulse signal; and discharge a second droplet having a second size smaller than the first size in response to the second drive pulse signal.

16. The drive controller according to claim 9, wherein the liquid discharge head is further configured to:

discharge the liquid in a first cycle; and discharge the liquid in a second cycle shorter than the first cycle.

17. A head device comprising:

a liquid discharge head, the liquid discharge head including a discharge port and a valve, the liquid discharge head configured to discharge a liquid from the discharge port; and circuitry configured to, cause the liquid discharge head to discharge the liquid from the discharge port, transmit a plurality of drive pulse signals to the valve, each of the plurality of drive pulse signals causing the valve to open and close the discharge port, the plurality of drive pulse signals including, a first drive pulse signal including a first increasing section, a first holding section, and a first decreasing section, and a second drive pulse signal including a second increasing section, a second holding section, and a second decreasing section, the first holding section causing the valve to hold at a first displacement amount for a first holding time period, the second holding section causing the valve to hold at a second displacement amount for a second holding time period, the second holding time period being shorter than the first holding time period, and an average value of the second displacement amount is larger than an average value of the first displacement amount, wherein a speed of the valve in the first increasing section is slower than the speed of the valve in the second increasing section, and the speed of the valve in the first decreasing section is slower than the speed of the valve in the second decreasing section.

18. The head device according to claim 17, wherein the circuitry is further configured to:

cause the liquid discharge head to discharge a first droplet having a first size based on the first drive pulse signal; and cause the liquid discharge head to discharge a second droplet having a second size smaller than the first size based on the second drive pulse signal.

19. The head device according to claim 17, wherein the circuitry is further configured to:

cause the liquid discharge head to discharge the liquid in a first cycle; and cause the liquid discharge head to discharge the liquid in a second cycle shorter than the first cycle.

20. A liquid discharge apparatus comprising:

the head device according to claim 17.

* * * * *